Patented Apr. 7, 1953

2,634,213

UNITED STATES PATENT OFFICE 2,634,213

STABILIZATION OF FATS AND OILS

James B. Martin, Woodlawn, Ohio, assignor to The Procter & Gamble Company, Cincinnati, Ohio, a corporation of Ohio No Drawing. Application May 5, 1950, Serial No. 160,400

12 Claims. (Cl. 99—163)

This invention relates to stabilization of shortenings, particularly stabilization against oxidative deterioration at temperatures such as are used in deep fat frying.

A large number of materials have been proposed for oil and fat stabilization against the development of rancidity due to oxidation. Among these materials are propyl gallate, syringic acid, nor-di-hydro-guaiaretic acid, hydroquinone and many others. However, the value of these antioxidants mainly lies in their ability to delay such development of rancidity in the normal range of room temperature and they, as well as other antioxidants heretofore proposed, are not effective in the stabilization of fatty glycerides against changes accompanying oxidative deterioration at high temperatures, such changes including increase in viscosity, increase in fatty acid content, formation of polymerized fatty matter, increase in refractive index, and destruction of tocopherol.

It is an object of this invention to provide a method for the stabilization of shortenings at high temperature against oxidative deterioration and accompanying changes. Another object is to provide a shortening which is stabilized against oxidative deterioration during use in deep fat frying processes, which commonly are conducted in the neighborhood of 190° C. A further object is to inhibit the oxidative decomposition of tocopherol in shortenings when heated to temperatures normally used in deep fat frying.

Other objects and advantages of this invention will be apparent from the following description.

I have discovered that the incorporation of very small quantities of certain aliphatic organo-silicon oxide polymers, as more fully hereinafter defined, in shortenings which are substantially free from oxidized and polymerized products yields a composition which serves adequately for all ordinary culinary use and which has special advantages for use in deep fat frying operations. By stabilization of the shortening against oxidative deterioration at high temperature in accordance with my invention, the formation of these constituents which impart foaming characteristics to the shortening when used in deep frying in the presence of water is markedly reduced. Moreover, I have discovered that there is a material decrease at frying temperatures in the destruction of the tocopherol, a natural antioxidant of vegetable origin for shortenings at ordinary temperatures of storage. This stabilization of tocopherol is advantageous in that the development of rancidity in the frying oil during storage and also the development of rancidity in oil adhering to foods (e. g. potato chips) after frying, especially during marketing, is materially reduced.

I am aware of proposals heretofore made that organo-silicon oxide polymers be used to prevent foaming in lubricating mineral and glyceride oils which have a tendency to foam, but these prior teachings have failed to set forth those critical conditions which, for example, must be observed to achieve adequate stabilization of edible shortenings against oxidative deterioration during use at high temperature without rendering the shortening unsuitable for general culinary uses. It is essential that the following differentiating features of my invention be fully understood.

First, the shortening before treatment in accordance with my teaching should be non-foaming in character and should be substantially free from those products of oxidative deterioration which, for example, impart foaming tendencies when the shortening is used for the deep-fat frying of moisture-containing foods, such as potatoes, and the addition of organo-silicon oxide polymers in the range of concentrations of my invention does not suppress foaming of such deteriorated oils. The term "non-foaming" is employed herein to describe shortenings which develop not substantially more than ⅛ inch of foam in the hereinafter described foam test.

Second, the amount of organo-silicon oxide polymer incorporated with the shortening to retard the formation of oxidized and polymerized constituents at high temperature and thereby retard the development of foaming tendencies is limited. There is a maximum as well as a minimum limit of concentration, and amounts in excess of the maximum will actually impart foaming characteristics to the shortening.

Third, if the shortening is adapted for use in cake baking as well as for use in deep-fat frying, then the maximum amount of organo-silicon oxide polymer used in the composition is also critical with respect to baking performance. Too much organo-silicon oxide polymer will result in cakes of high density and inferior texture.

Fourth, the use of too much organo-silicon oxide polymer will also cause serious darkening of the shortening when used in the deep fat frying of foods, especially proteinaceous foods, such as fish.

Fifth, a minimum concentration of organo-silicon oxide polymer in the shortening must be observed in order that the tocopherol content may be protected against decomposition at high temperatures used for deep fat frying.

I have found that the use of 0.03 to 0.5 p. p. m.

(parts per million) of methyl silicone is generally applicable in the practice of my invention; but I have also found that if all of the above objects are to be realized without attendant disadvantages of high silicone concentration it is preferable to employ concentrations in the range of 0.05 to 0.2 p. p. m.

The organo-silicon oxide polymers which find use in the practice of my invention are those products of condensation polymerization containing at least one kind of the following substituted silicon oxide residues:

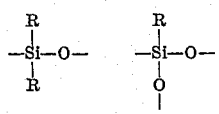

In the polymers thus referred to the linkages between silicon atoms are of the silicon-oxygen-silicon type and each "R" is a radical of the group consisting of lower molecular weight alkyl and alkoxy radicals, such as —CH$_3$ and —OCH$_3$ and close homologues thereof, the polymers having not only a high degree of condensation polymerization but also low volatility at 200° C. Excellent examples of such polymers are the following typical straight and branched chain methyl silicones

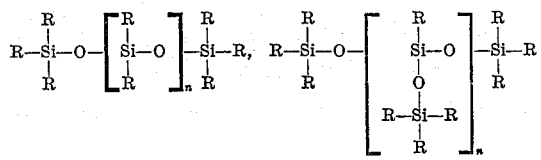

and

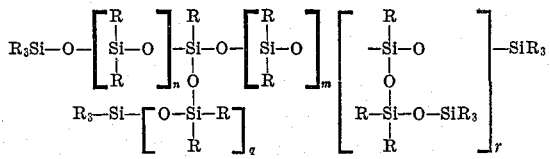

respectively wherein R is CH$_3$ and $n$, $m$, $q$, and $r$ are integers of such magnitude that the polymers possess the above mentioned low volatility and have a viscosity of at least 50 centistokes at 25° C.

There appears to be no upper limit to the degree of condensation polymerization in the silicones used in my invention, but it should be borne in mind that increase in molecular weight of the polymer is accompanied by increase in viscosity and that increased difficulties with dispersion of the silicone in the fatty glyceride may be encountered at higher viscosities. Silicones having such high viscosities as to be non-dispersible are ineffective. The breadth of the operative range of viscosities is generally indicated by the fact that I have used silicones having viscosities at 25° C. ranging from 50 to over 1,000,000 centistokes with excellent results. Selection of the polymers on the basis of viscosity rather than molecular weight has obvious advantages, the viscosity being readily measured by well known instruments such as the Saybolt Universal viscosimeter. Readings obtained therewith are readily converted into centistoke units. (See Marks Mechanical Engineers Handbook, Fourth edition, 1941, pages 244 and 5, published by McGraw-Hill Book Co., N. Y., N. Y.)

The invention is illustrated by the following examples wherein, unless otherwise indicated:

(1) Parts and percentages are on a weight basis.

(2) Refractive indices of shortenings are in terms of the Butyro scale at 48° C.

(3) The "190° C. test" consists of heating 40 g. portions of the shortening under test at 190° C. for 48 hours in 50 cc. uncovered beakers. The deterioration of the shortening during this test is in part judged by the increase in refractive index of the shortening occurring during the heating period, the higher the increase, the greater the degree of oxidation and polymerization of the shortening.

(4) "Foam test" values are the number of inches of foam present on the shortening under test at the end of a 1½ minutes frying operation beginning with the insertion of 6 cylindrical pieces of freshly cut potato 10 mm. in diameter and 13 mm. long into approximately 40 gm. of the shortening which is at a temperature of 200° C. The frying is conducted in a tall glass beaker having an inside diameter of 48 mm. and a height of 175 mm.

(5) Tocopherol values are those obtained according to the method of Stern and Baxter, Ind. Eng. Chem., Anal. ed. 19, 902 (1947).

(6) The "gum test" is a determination of the amount of polymerized fatty matter that collects on the inside of a 180 cc. tall form beaker while heating 100 cc. of shortening in the beaker at a temperature of about 182° C. for 200 hours. After the prescribed heating period is completed the shortening is poured out of the beaker and the beaker is rinsed twice with 50 cc. portions of petroleum ether to remove any traces of shortening without removing a significant amount of the adhering polymerized fatty matter. The difference between the weight of the "gum"-containing beaker and the weight of the beaker before the test is recorded as per cent gum.

(7) "Lovibond colors" are read on a 1 inch column of the fatty glyceride.

*Example 1.*—Two portions of a commercial edible plastic all vegetable oil shortening were stabilized by uniformly dispersing throughout the portions in liquid form 0.2 p. p. m. and 0.5 p. p. m., respectively, of a methyl silicone containing branched chain polymers, having a greasy, butter-like consistency and therefore a viscosity greatly in excess of 50 centistokes at 25° C., prepared by the Dow-Corning Corporation of Midland, Michigan, under the trade name of "D. C." Antifoam A, hereinafter designated by the letter "A."

Two more portions of the same shortening were stabilized in a corresponding manner with like amounts of a straight chain methyl silicone, hereinafter designated by the letter "S," and having a viscosity of 100 centistokes at 25° C.

To insure accurate measurement and also to facilitate uniform dispersion of the small amounts of silicones used in the shortenings, appropriate portions of uniform mixtures equivalent to one gram each of the respective silicones dissolved or dispersed in one liter portions of benzene were added to small amounts of the melted shortening in quantities sufficient to give concentrations of 10 p. p. m. of silicone "A" and 50 p. p. m. of "S." Each was thoroughly agitated and the benzene was subsequently removed by steam deodorization at 200° C. and 2 mm. mercury absolute pressure. Appropriate dilutions were made from the deodorized samples with shortening containing no silicone to give the above indicated concentrations of 0.2 and 0.5 p. p. m. All samples, including a control to which no silicone was added, were first subjected to the "190° C. test" and then to the "foam test." The data obtained, reproduced in Table I below, show that the refractive index rise in the untreated shortening was from 5 to 10 times that which occurred in the silicone treated shortening and that the silicone substantially eliminated the tendency of the shortening to develop foaming characteristics. Thus the silicones markedly inhibited oxidative deterioration during prolonged heating at high temperature.

TABLE I

|  | R. I. Rise in 190° C. Test | Foam Test after 190° Test, Inches of Foam [1] |
|---|---|---|
| Untreated Shortening | 8.1 | 4⅓ |
| Treated Shortening: | | |
| Silicone "S"— | | |
| 0.2 p. p. m | 1.0 | ⅛ |
| 0.5 p. p. m | 1.7 | ⅛ |
| Silicone "A"— | | |
| 0.2 p. p. m | 1.2 | ¼ |
| 0.5 p. p. m | .8 | ⅛ |

[1] These values show the tendency to foam that developed during the 48 hours' oxidation at 190° C. since all samples had a zero foam test rating at the beginning of the 48 hour period.

Methyl silicones having viscosities of 50, 200, 500, and 30,000 centistokes have been used in place of the methyl silicone employed in the composition of the above example with substantially the same results as to stabilization of the shortening and attendant effect on foaming, and even though the silicone viscosity is increased to values such as 200,000 and 1,000,000 centistokes, the stabilizing effect obtained is still so marked that the foaming tendencies are substantially eliminated at concentrations of about 0.5 p. p. m.

However, I find that at concentrations below about 0.03 p. p. m. of even the most active methyl silicones that the stabilization obtained is unsatisfactory. On the other hand, the employment of excessive amounts, such as over 10 p. p. m., of many of the methyl silicones that serve as antioxidants in my invention, even with those shortenings which are free of oxidized and polymerized constituents and which have no foaming tendencies initially, will impart undesirable foaming characteristics to the composition at the outset.

Similar reductions in refractive index rise and foam development are also observed in the case of the treatment of both hydrogenated and unhydrogenated oils such as hog lard, soybean oil and cottonseed oil in accordance with the above example.

*Example 2.*—Samples of plastic shortening were prepared from a partially hydrogenated mixture of about two parts of cottonseed oil and about seven parts of soybean oil having an iodine value of about 77, and a minor proportion of a substantially completely hydrogenated glyceride from cottonseed oil. Amounts ranging from 0.0 to 10 p. p. m. of a straight chain methyl silicone having a viscosity of 100 centistokes at 25° C. were thoroughly mixed with the respective samples of the molten fatty mixture prior to conversion to the plastic form. Repeated cake making tests were performed using these products and corresponding products containing no silicone in accordance with the following accepted cake making procedure.

*Formula*

Sugar _____ 2 lbs., 8 oz.
Shortening _____ 1 lb., 6 oz.
Salt _____ ¾ oz.
 (Cream at low or medium speed
  in cake mixer for 5 minutes.)
Eggs _____ 1 lb., 9 oz.
 (Add while creaming during an
  additional 5 minutes and continue to cream for 5 minutes
  more.)
Milk _____ 1 lb., 9 oz.
 (Add milk and stir in.)
Flour _____ 2 lbs., 8 oz.
Baking powder _____ 1 oz.
 (Sift together, add, stir in and
  mix smooth at low speed.)

These tests, wherein 400 gram portions of the batter were baked in 8 inch circular cake tins at 375° F., showed that those cakes containing 0.5 p. p. m. and less of the silicone had densities and textures as good as the control cakes prepared with comparable shortening containing no silicone. However, cakes that were prepared with shortening containing more than 0.5 p. p. m. silicone were high in density and poor in texture. Like results were also obtained with cakes prepared from shortening containing "A" silicone described in Example 1. These tests indicate that no more than 0.5 p. p. m. of the silicone should be employed in a shortening suitable for use both in baking and deep frying.

It will be observed that the shortening of Example 2 does not contain emulsifying agents, for example fatty mono- or di-glycerides as are sometimes used in preparing current commercial shortenings. Tests have shown that in shortenings which contain fatty mono- or di-glycerides and which may find use in both frying and baking operations where cake formulas designating the use of more sugar than flour are employed, the maximum amount of methyl silicones incorporated should be somewhat lower than 0.5 p. p. m., preferably in the neighborhood of 0.2 p. p. m.

Deep frying of foods in shortenings of the nature of those used in Example 2 have also served to establish upper limits of silicone content. In addition to other advantages mentioned above, silicones also stabilize the shortening against darkening at frying temperatures, but I have found that when foods, particularly protein-containing foods, are fried in such stabilized shortening, objectionable darkening may occur when more than 0.2 p. p. m. of methyl silicones is used. The following example shows a typical case wherein the use of silicone within the preferred range of 0.05 to 0.2 p. p. m. stabilized a shortening during deep fat frying without the objectionable darkening of the shortening as discussed above.

*Example 3.*—Two portions of a mixture of hydrogenated glycerides such as used in Example 2 were used for preparing plastic shortenings. To one portion was added 0.1 p. p. m. of the "S" type methyl silicone of Example 1 in the form of a 1% mixture in hexane and thoroughly mixed therewith. Both portions of the glycerides were then deodorized separately with steam for 3 hours at a temperature of 200° C. and an absolute pressure not exceeding ½ inch of mercury and each converted to the plastic form. A ten pound sample of each shortening was used as a deep frying fat in the preparation of fried scallops. Each day for five days both samples were heated to and thermostatically controlled at about 180° C. and the heat turned off again 8 hours later making a total of 40 hours of heating. In the case of each shortening six 100 gm. batches of scallops were fried on each day at the controlled temperature.

The following table shows the free fatty acid content and the color of the frying fat at the end of 5 days.

TABLE II

| Silicone Content Frying Fat | Percent Free Fatty Acid | Lovibond Color (1″ column) |
|---|---|---|
| none | 0.65 | 13 red. |
| 0.1 p. p. m. | 0.40 | 8 red. |

During the above frying test ½ pound samples of the frying fat were removed after each day's frying was completed and foam tests were performed on portions thereof. The results in the following table show that the methyl silicone so delayed the formation of polymerized fatty matter that the stabilized frying fat showed a zero foam test until the completion of the 5th day at which time it foamed only approximately the same amount as the unstabilized frying fat did at the end of the 2nd day.

TABLE III

| Time of Test | Foam Tests (inches of foam) | |
|---|---|---|
| | 0.1 p. p. m. Silicone | No Silicone |
| End of— | | |
| 1st day | 0 | 0 |
| 2nd day | 0 | 3⅜ |
| 3rd day | 0 | 2¼ |
| 4th day | 0 | 3¼ |
| 5th day | ¾ | 3⅝ |

It is to be recorded that if the silicones employed to effect stabilization were not added to the frying fat until, for example, the end of five days' use in deep frying, foaming on subsequent use in frying would not be effectively reduced. Thus to obtain the full benefits of my invention it is necessary that the silicones be added to fatty glycerides that have not undergone oxidative deterioration or that are substantially free of oxidized and polymerized fatty matter.

The protection against high temperature oxidation afforded by the methyl silicones is further shown by the determination of the amount of gum formed in the two shortenings of Example 3 during a heating period of 200 hours at about 182° C. "Gum tests" showed that only one third as much gum was formed in the silicone stabilized fat (0.11%) as was formed in the control fat that contained no silicone (0.33%).

*Example 4.*—Two samples of the shortening prepared in Example 2 containing none and 0.2 p. p. m. of the methyl silicone, each of which contained 0.12% tocopherol, were used for deep frying of scallops as in Example 3. At the end of 16 hours at the frying temperatures, analyses showed that the silicone-treated shortening still contained 0.083% tocopherol whereas the tocopherol content of the shortening to which no silicone had been added was only 0.011%, illustrating the marked stabilizing effect of silicones against destruction of tocopherol at 190° C. Tests performed at both lower and higher temperatures indicated that the stabilizing effect of the silicones on tocopherol was at a point of maximal effectiveness at about 190° C. At higher temperatures such as 210–220° C. there was very little if any increase in tocopherol stabilization. However, as the temperature was dropped below 190° C. this stabilizing effect began to decrease, at 150° C. it fell off rapidly and at 120° C. it was negligible. This unexpected, specific protection against high temperatures destruction of tocopherol by silicones is very pronounced even in the presence of large amounts of metal pro-oxidants, such as copper.

Methyl silicones having viscosities of 50, 200, 500, 1000, and 30,000 centistokes have been used in place of the methyl silicone employed in the composition of the above example with substantially the same results as to stabilization of tocopherol against oxidative decomposition at high temperature.

I have also found that in the case of a methyl silicone having a viscosity of 1,000,000 centistokes stabilization of tocopherol has been effected, but concentrations of 0.3 to 0.5 p. p. m. are preferable in order to obtain maximal protection against oxidative decomposition.

The stabilizing effect of silicones on shortenings is evident from other changes in properties in addition to those indicated above. Thus within the silicone concentration range of 0.003 to 0.5 p. p. m. other improvements are obtained at frying temperatures, such as retardation of viscosity increase and a decrease in iodine value drop, both of which improvements are indicative of a reduction in oxidation and polymerization.

In the practice of this invention, it is desirable to obtain uniform distribution of the silicone throughout the shortening. Whereas this distribution can be obtained merely by thorough agitation, it is frequently desirable to dissolve or disperse the silicone in an organic medium such as hexane or benzene which is readily miscible with the glyceride used in preparing the shortening and which is sufficiently volatile to permit its removal by means such as steam deodorization.

In the practice of my invention, as for example in the stabilization of shortenings, margarines, cooking oils, etc. other additives may be included in the fatty compositions with the silicone, such as low temperature anti-oxidants, coloring and flavoring agents, and emulsifiers.

In the term "shortenings" I include fatty glycerides such as animal, vegetable and marine oils and fats, either in the unhydrogenated or hydrogenated state, and mixtures thereof, intended as an all purpose product for general culinary use, such uses including, in addition to pastry and cake making, deep fat frying and salad preparation.

In the preparation of such glycerides for use in shortenings I preferably refine the oils and fats by processes such as caustic refining, bleeching, deodorization, etc. to insure satisfactory color, odor and flavor in the product.

Having thus described my invention, what I claim and desire to secure by Letters Patent is:

1. A shortening stabilized against oxidative deterioration at temperatures encountered in the deep fat frying of foods and suitable for use in cake baking, comprising non-foaming fatty glyceride and a stabilizing amount of methyl silicone having a viscosity of at least 50 centistokes, said amount being not less than 0.03 p. p. m. and not more than 0.5 p. p. m. of said fatty glyceride.

2. The shortening of claim 1 in which the amount of methyl silicone is not less than 0.55 p. p. m. and not more than 0.2 p. p. m. of the fatty glyceride.

3. The shortening of claim 1 in which the silicone is selected from a group consisting of straight and branched chain methyl silicones and mixtures thereof.

4. The shortening of claim 1 in which the methyl silicone has a viscosity in the range of 50 to 1,000,000 centistokes.

5. The shortening of claim 1 in which the methyl silicone has a viscosity of from 50 to 1000 centistokes.

6. The shortening of claim 1 in which the methyl silicone has a viscosity of from 1000 to 30,000 centistokes.

7. The shortening of claim 1 in which the methyl silicone has a viscosity of from 30,000 to 1,000,000 centistokes.

8. An edible plastic shortening stabilized against oxidative deterioration at temperatures encountered in the use of the shortening for deep fat frying purposes comprising a mixture of non-foaming hydrogenated fatty glycerides in plastic form, and containing a stabilizing amount of methyl silicone having a viscosity of at least 50 centistokes, said amount being not less than 0.03 p. p. m. and not more than 0.5 p. p. m. of said fatty glyceride.

9. A fatty composition stabilized against oxidative deterioration at temperatures encountered in deep fat frying of foods and possessing natural stability against development of rancidity at temperatures in the normal range of room temperature both before and after use in deep fat frying, comprising non-foaming fatty glyceride but which contains a stabilizing amount of natural tocopherol, and a stabilizing amount of methyl silicone having a viscosity of at least 50 centistokes, said amount being not less than 0.03 p. p. m. and not more than 0.5 p. p. m. of said fatty glyceride.

10. An edible fatty composition stabilized against oxidative deterioration encountered in deep fat frying of foods, and adapted to use as a frying fat and for use as a shortening in cake baking, comprising a mixture of non-foaming fatty glycerides in plastic form and containing a stabilizing amount of methyl silicone having a viscosity of at least 50 centistokes, said amount being not less than 0.03 p. p. m. and not more than 0.5 p. p. m. of said fatty glyceride.

11. A shortening stabilized against oxidative deterioration at temperatures encountered in the deep fat frying of foods, comprising non-foaming fatty glyceride and a stabilizing amount of an aliphatic organo-silicon oxide polymer that is a silicone in which the silicon-oxide residues are selected from the group consisting of

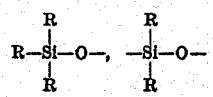

and

wherein the R radicals are methyl and ethyl, said silicone having a viscosity of at least 50 centistokes, said amount being not less than 0.03 p. p. m. and not more than 0.5 p. p. m. of said fatty glyceride.

12. The shortening of claim 11 in which the viscosity of the silicone is less than 1,000,000 centistokes.

JAMES B. MARTIN.

REFERENCES CITED

The following references are of record in the file of this patent:

UNITED STATES PATENTS

| Number | Name | Date |
| --- | --- | --- |
| 2,375,007 | Larsen | May 1, 1945 |